United States Patent
Yoon

(10) Patent No.: US 9,384,776 B2
(45) Date of Patent: *Jul. 5, 2016

(54) CLAMPING DEVICE OF SPINDLE MOTOR INCLUDING CASE HAVING INCLINATION SURFACE

(71) Applicant: LG INNOTEK CO., LTD., Seoul (KR)

(72) Inventor: Hoeop Yoon, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/071,162

(22) Filed: Nov. 4, 2013

(65) Prior Publication Data

US 2014/0068644 A1    Mar. 6, 2014

Related U.S. Application Data

(63) Continuation of application No. 13/376,016, filed as application No. PCT/KR2010/003547 on Jun. 2, 2010, now Pat. No. 8,607,258.

(30) Foreign Application Priority Data

Jun. 2, 2009    (KR) .................. 10-2009-0048569

(51) Int. Cl.
  *G11B 17/051*    (2006.01)
  *G11B 17/028*    (2006.01)
(52) U.S. Cl.
  CPC ........ *G11B 17/0515* (2013.01); *G11B 17/0282* (2013.01)

(58) Field of Classification Search
  CPC . G11B 17/022; G11B 17/028; G11B 17/0282
  USPC ......... 720/604, 605, 695, 703, 704, 706–709, 720/712–714
  See application file for complete search history.

(56) References Cited

U.S. PATENT DOCUMENTS

| | | | |
|---|---|---|---|
| 2006/0031867 A1* | 2/2006 | Ikemoto | G11B 19/2009 720/707 |
| 2007/0157219 A1* | 7/2007 | Oota | 720/604 |
| 2007/0200465 A1 | 8/2007 | Shiga | |
| 2008/0046905 A1* | 2/2008 | Takaki et al. | 720/707 |

(Continued)

FOREIGN PATENT DOCUMENTS

| | | |
|---|---|---|
| CN | 1926620 A | 3/2007 |
| JP | 11-339348 A | 12/1999 |

(Continued)

OTHER PUBLICATIONS

Office Action dated Jul. 2, 2013 in Chinese Application No. 201080034315.8, filed Jun. 2, 2010.

(Continued)

*Primary Examiner* — Nathan Danielsen
(74) *Attorney, Agent, or Firm* — Saliwanchik, Lloyd & Eisenschenk

(57) ABSTRACT

The clamping device of spindle motor is disclosed, wherein a case portion contacted by the other distal end of the arms is inclined due to depression of a distal end of the arms by the disk, such that the arms linearly moves into the case to allow the other distal end to further rotate upwards, whereby the disk can be easily inserted into the case regardless of size of the inner diameter of the disk.

4 Claims, 6 Drawing Sheets

(56) References Cited

U.S. PATENT DOCUMENTS

2008/0235720 A1* 9/2008 Takaki et al. ............... 720/704
2009/0106784 A1   4/2009 Yoon

FOREIGN PATENT DOCUMENTS

| JP | 2000-067497 | A | 3/2000 |
| JP | 2000-149363 | A | 5/2000 |
| JP | 2002-334495 | A | 11/2002 |
| JP | 2008-027514 | A | 2/2008 |
| KR | 10-2008-0105815 | A | 12/2008 |
| KR | 10-2209-0040606 | A | 4/2009 |

OTHER PUBLICATIONS

Office Action dated Nov. 13, 2012 in Japanese Application No. 2012-513869, filed Jun. 2, 2010.
Office Action dated May 21, 2012 in Japanese Application No. 2012-513869, filed Jun. 2, 2010.
International Search Report in International Application No. PCT/KR2010/003547, filed Jun. 2, 2010.

* cited by examiner

CLAMPING DEVICE OF SPINDLE MOTOR INCLUDING CASE HAVING INCLINATION SURFACE

CROSS-REFERENCE TO RELATED APPLICATIONS

This application is a continuation of U.S. application Ser. No. 13/376,016, filed Dec. 2, 2011, which is the U.S. national stage application of International Patent Application No. PCT/KR2010/003547, filed Jun. 2, 2010, which claims priority to Korean Patent Application No. 10-2009-0048569, filed Jun. 2, 2009, all of which are hereby incorporated by reference in their entirety.

TECHNICAL FIELD

The present invention relates to a clamping device of spindle motor, and more particularly to a clamping device of a spindle motor capable of easily inserting a disk and supporting a disk in response to various inner diameters of disks.

BACKGROUND OF THE INVENTION

A spindle motor performs the function of rotating a disk to enable an optical pickup which linearly reciprocates in an optical disk drive (ODD) to read data recorded on the disk. The spindle motor is installed with a clamping device for supporting the disk mounted on a turn table or a rotor yoke.

Generally, the clamping device includes a case into which the disk is inserted, a plurality of claws integrally formed at a lateral plate of the case for supporting in such a way that a center of the disk corresponds to that of the case, a plurality of arms rotatively and linearly installed to enter the lateral plate of the case and to inhibit the disk from being disengaged, and an elastic member elastically supporting the arms.

In a case the disk is inserted into the case, a front lateral upper surface of the arms is contacted by an inner lower corner portion of the disk, whereby the arms rotate in such a manner that the arms descend at a front end thereof while arms rise at a rear end thereof. In a case a rear upper surface of the arms is brought into contact with an upper plate of the case, the arms are restricted in rotation so that the arms linearly move into the lateral plate of the case.

The disk has a deviation in its inner diameter. Therefore, in a case a disk with a small inner diameter is inserted into the case, there is needed a large insertion force, while in a case a disk with a large inner diameter is inserted into the case, there is needed a smaller insertion force.

In the conventional clamping device of the spindle motor, a rotation angle of the arms is always constant, because an upper plate portion of the case contacting the rear end portion of the arms is formed with a thickness of flat even surface. The disk with a smaller inner diameter suffers from a disadvantage in that an excessive insertion force is needed in case of being inserted into the case.

DETAILED DESCRIPTION

Technical Problem

The present invention is disclosed to obviate the above-mentioned problems, and it is an object to provide a clamping device of a spindle motor capable of easily inserting the disk regardless of size of inner diameter of the disk.

Technical Solution

In one general aspect of the present invention, there is provided a clamping device of a spindle motor, the device comprising: a case rotating with a rotation shaft and inserted by an inner surface of a disk; a plurality of arms including a body, a guide rail and a disengagement prevention rail integrally moving, one distal end being positioned at a lateral outer side of the case to contact an inner surface of the disk, while the other distal end being positioned at a lateral inner side of the case for rotative and linear movement whereby the disk is inhibited from being disengaged from the case; and an elastic member elastically supporting the arms toward the outer side of a lateral plate of the case, wherein if the disk is inserted into the case, the case portion contacting an upper surface of the other distal end of the disengagement prevention rail at the arms is formed with an inclination surface whose thickness tapers off as it goes into the case because the disk depresses a distal end of the arm, and wherein the inclination surface is formed as a plain surface.

In another general aspect of the present invention, there is provided a clamping device of a spindle motor, the device comprising: a case rotating with a rotation shaft and inserted by an inner surface of a disk; a plurality of arms including a body, a guide rail and a disengagement prevention rail integrally moving, one distal end being positioned at a lateral outer side of the case to contact an inner surface of the disk, while the other distal end being positioned at a lateral inner side of the case for rotative and linear movement whereby the disk is inhibited from being disengaged from the case; and an elastic member elastically supporting the arms toward the outer side of a lateral plate of the case, wherein if the disk is inserted into the case, the case portion contacting an upper surface of the other distal end of the disengagement prevention rail at the arms is formed with an inclination surface whose thickness tapers off as it goes into the case because the disk depresses a distal end of the arm, and wherein the inclination surface is curved as concave or convex.

In some exemplary embodiments of the present invention, the inclination surface may start with a rounded form.

Advantageous Effects

The clamping device of a spindle motor according to the present invention is advantageous in that a case portion contacted by the other distal end of the arms is inclined due to depression of a distal end of the arms by the disk, such that the arms linearly moves into the case to allow the other distal end to further rotate upwards, whereby the disk can be easily inserted into the case regardless of size of the inner diameter of the disk.

MODE FOR INVENTION

A clamping device of a spindle motor according to the exemplary embodiments of the present invention will be described in detail with reference to the accompanying drawings.

Figure 1:
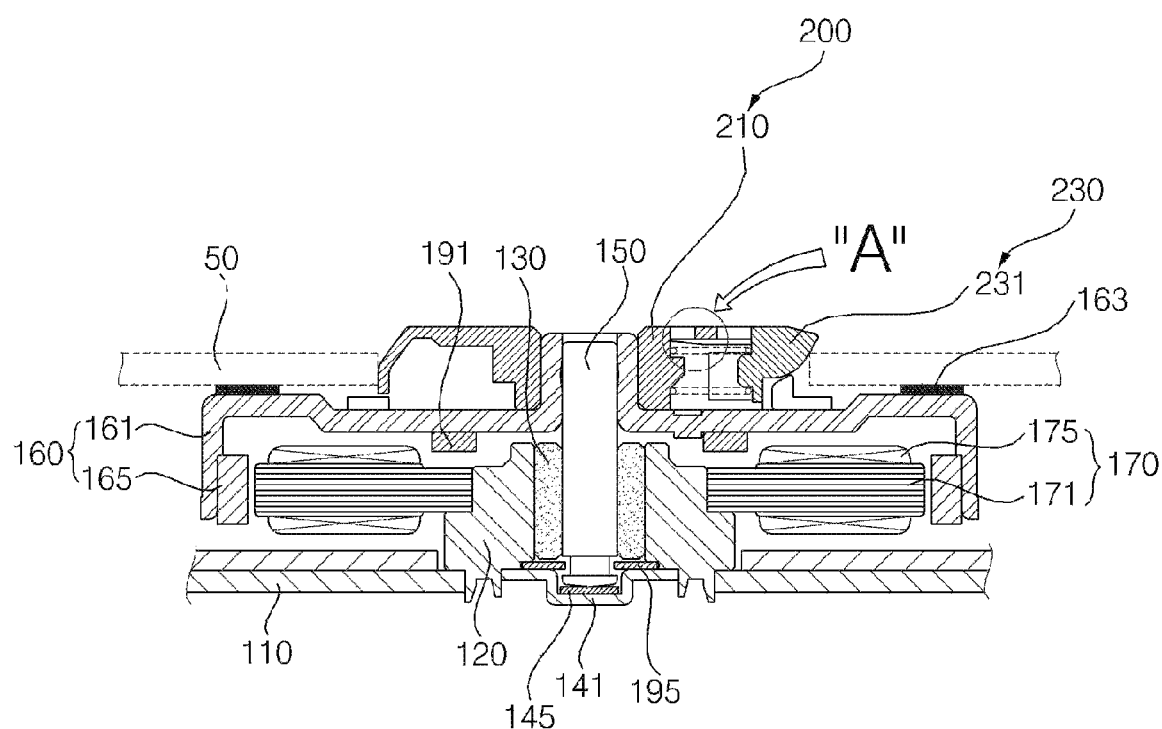
FIG. 1 is a cross-sectional view illustrating a spindle motor according to an exemplary embodiment of the present invention.

FIG. 1 is a cross-sectional view illustrating a spindle motor according to an exemplary embodiment of the present invention.

Referring to FIG. 1, a base (110) is vertically formed with a bearing housing (120).

In designating a direction and a surface of constituent parts, a direction and a surface facing an upper vertical side of the base (110) are respectively called "an upper side" and "an upper surface", while a direction and a surface facing a bottom vertical side of the base are respectively called "a bottom side" and "a bottom surface". A stator is provided at an upper surface of the base (110).

The cylindrical bearing housing (120) is opened at both ends, and a bearing (130) is press-fitted into an inner circumference of the bearing housing (120). A bottom surface of the bearing housing (120) is hermetically sealed by a thrust stopper (141), and the hermetically sealed bottom surface of the bearing housing (120) is coupled to the base (110). The bearing (130) is supported by a bottom side of a rotation shaft (150) for rotational installation.

A thrust plate (145) is formed at a bottom surface of the rotation shaft (150) and the thrust stopper (141) to inhibit the thrust stopper (141) and the rotation shaft (150) from being brought into contact with each other, thereby inhibiting the tear and wear of the rotation shaft (150) and the thrust stopper (141).

An upper outer surface of the rotation shaft (150) exposed to upwards of the bearing housing (120) is coupled with a rotor (160), and an outer surface of the bearing housing (120) is coupled with a stator (170) rotating the rotor (160) in association with the rotor (160).

The rotor (160) is formed with a bottom-opened cylindrical rotor yoke (161) coupled at a central upper surface to the rotation shaft (150) to rotate with the rotation shaft (150), and a ring-shaped magnet (165) coupled to an inner surface of a rotor yoke (161) to oppose a periphery of the bearing housing (120).

The stator (170) is formed with a core (171) insertedly coupled to an inner surface of the bearing housing (120) and a coil (175) wound on the core (171).

In a case a current flows in the coil (175), the rotation shaft (150) and the rotor (160) are rotated by the electromagnetic force formed by the magnet (165) and the coil (175).

A felt (163) is coupled to an upper surface of the rotor yoke (161), and supports the rotor yoke (161) lest the disk (50) mounted on the rotor yoke (161) should slip away. A suction magnet (191) is coupled to the rotor yoke (161) to inhibit the rotation shaft (150) and the rotor (161) from floating when the rotation shaft (150) and the rotor (160) are rotated, and a washer stopper (195) is interposed between the bearing housing (120) and the thrust stopper (141) to inhibit the rotation shaft (150) from being disengaged upwards of the bearing housing (120).

The rotor yoke (161) portion coupled to the rotation shaft (150) is coupled to a clamping device (200) supporting the disk (50) mounted on the rotor yoke (161).

Now, the clamping device (200) according to the exemplary embodiment of the present invention will be described with reference to FIGS. 1 through 5.

Figure 2:
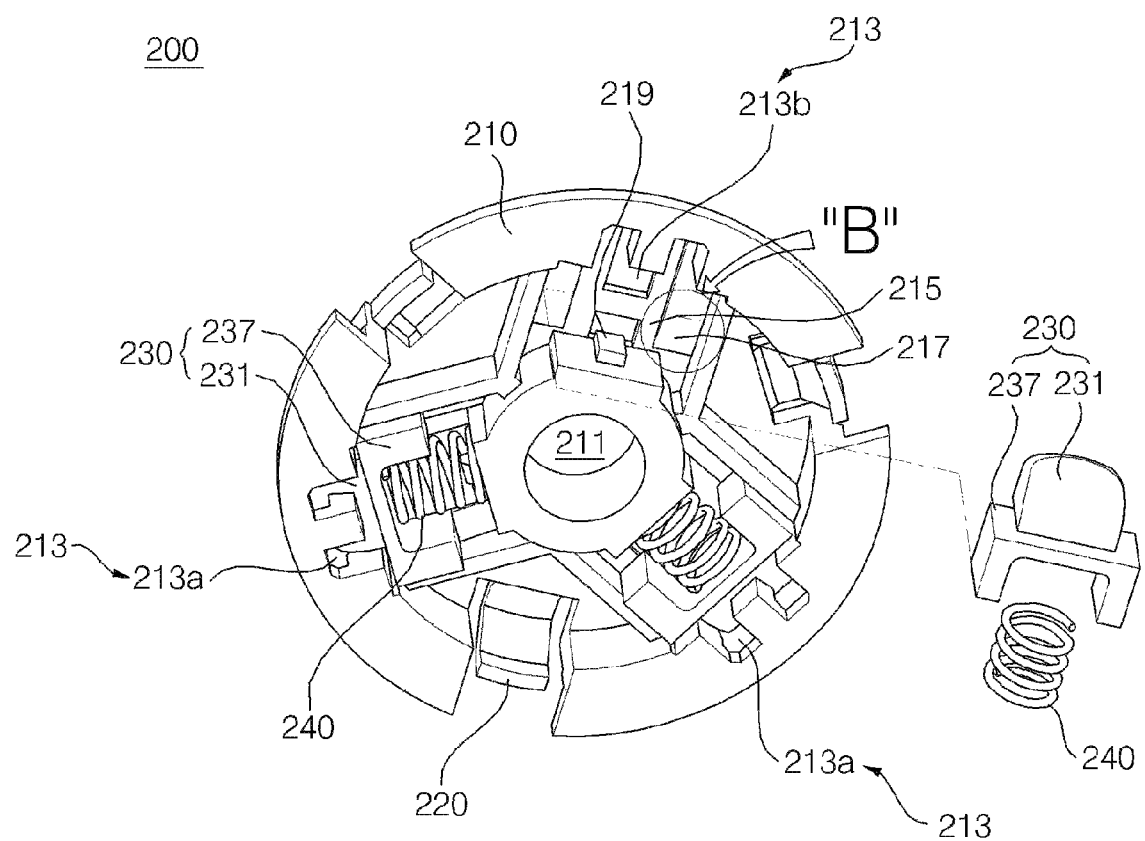
FIG. 2 is a bottom surface perspective view illustrating a clamping device of FIG. 1.
Figure 3:
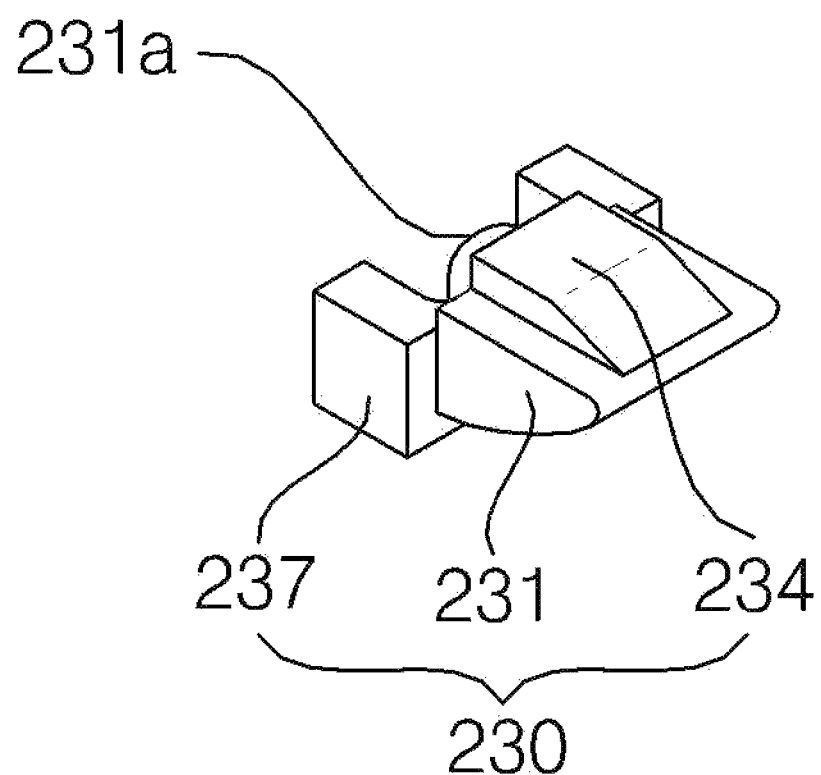
FIG. 3 is a plan perspective view of an arm illustrated in FIG. 2.
Figure 4:
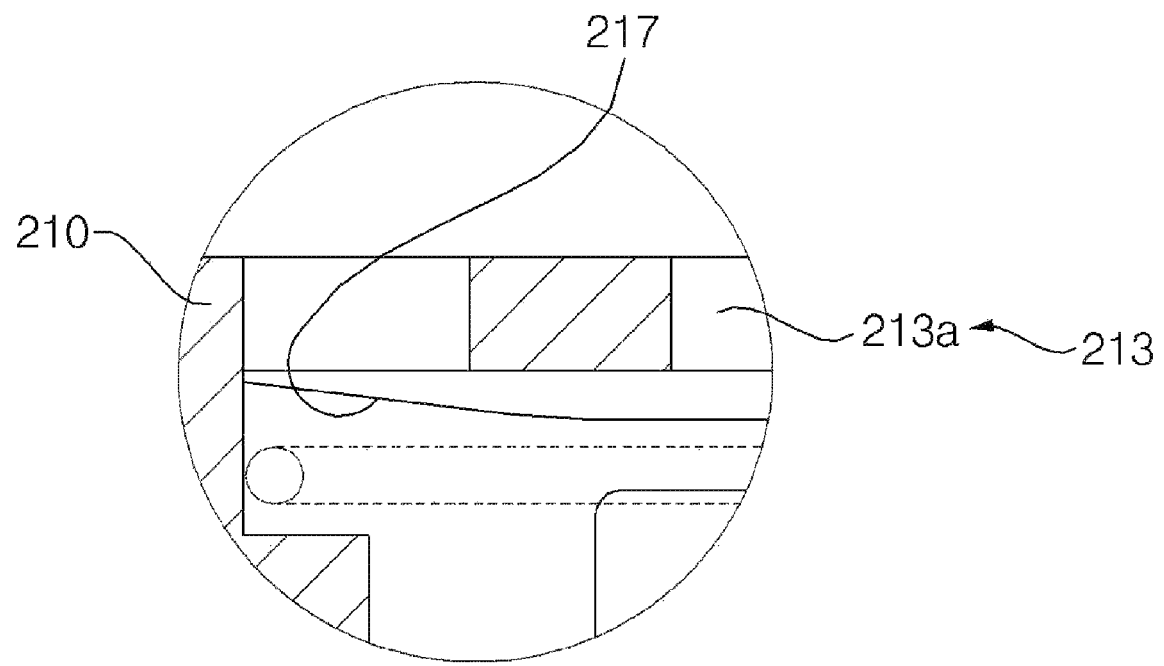
FIG. 4 is an enlarged view of "A" part of FIG. 1.
Figure 5:
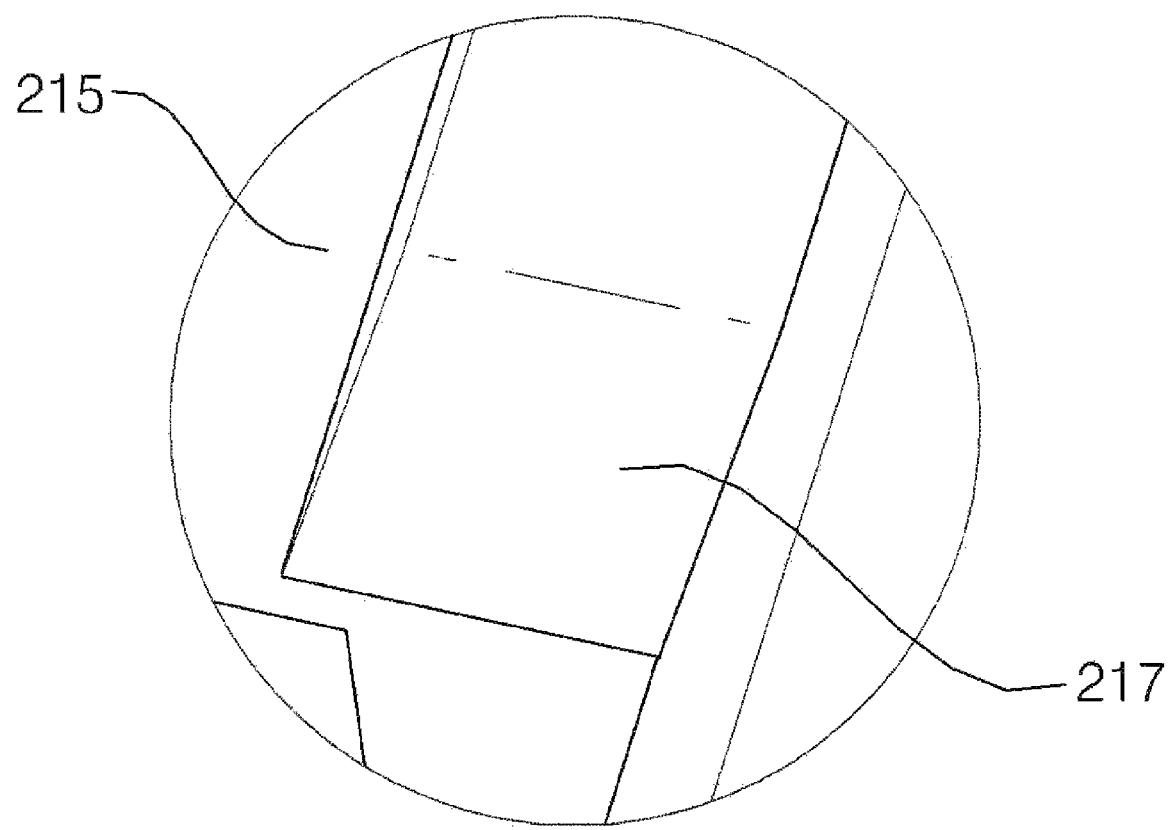
FIG. 5 is an enlarged view of "B" part of FIG. 2.

FIG. 2 is a bottom surface perspective view illustrating a clamping device of FIG. 1, FIG. 3 is a plan perspective view of an arm illustrated in FIG. 2, FIG. 4 is an enlarged view of "A" part of FIG. 1, and FIG. 5 is an enlarged view of "B" part of FIG. 2.

The clamping device (200) includes a case (210), claws (220), an arm (230) and an elastic member (240).

The case (210) is provided in a bottom-opened cylindrical shape. An upper central side of an upper plate of the case (210) is formed with a coupling hole (211) into which the rotor yoke (161) is coupled, and a lateral plate of the case (210) is inserted by the disk (50).

A plurality of claws (220) radially provided about the case (210) is integrally formed with the lateral plate of the case (210) and has an elasticity with a substantial cantilever shape. The claws (220) are brought into contact with an inner surface of the disk (50) inserted into the lateral plate of the case (210) to supportively allow the center of the disk (50) to correspond with that of the rotation shaft (150).

The case (210) is radially formed with a plurality of entry holes (213). The entry hole (213) is extended from an upper plate of the case (210) to the lateral plate of the case (210) to alternate with the claws (220) by being formed between the claws (220). Furthermore, the entry hole (213) near the claw (220) maintains an even gap. The entry hole (213) is positioned with an arm (230) formed with a body (231), a guide rail (234) and a disengagement prevention rail (237) to rotate and move in a linear manner.

The body (231) is positioned at one distal end thereof with a periphery of the lateral plate of the case (210) and at the other distal end with an inner surface of the lateral plate of the case (210) to enter the entry hole (213a) formed at the lateral plate of the case (210).

The guide rail (234) protrudes from the body (231) to be inserted into the entry hole (213b) formed on an upper plate of the case (210). The entry hole (213b) formed on the upper plate of the case (210) and the guide rail (234) functions to smoothly move the arms in a linear manner. A upwardly caved sill (215) is formed at a periphery of the entry hole (213) formed on the upper plate of the case (210) in order to securely support the linear movement of the arms (230), and an upper surface of the body (231) at the periphery of the guide rail (234) is accommodated with the sill (215).

The disengagement prevention rail (237) is extensively formed from the other distal end of the body (231) to the center side of the case (210). A distal end of the disengagement prevention rail (237) facing an peripheral later plate of the case (210) inhibits the arms (230) from being disengaged to the peripheral lateral plate of the case (210) by being contacted with the lateral plate of the case (210) in a case the arms (230) are moving toward the lateral plate side of the case (210). It should be apparent that the body (231), the guide rail (234) and the disengagement prevention rail (237) are integrally moving.

A lower corner of the inner surface of the disk (50) is brought into contact with an upper surface of a distal end of the body (231) at the arm (230) in a case the disk (50) descends from an upper side of the case (210). Thereafter, in a case the disk (50) descends, a distal end of the body (231) of the arm (230) is lowered by the disk (50), while the other distal end of the disengagement prevention rail (237) of the arm (230) allows the arm (230) to rotate in an upward manner.

Then, an upper surface of the other distal end of the disengagement prevention rail (237) at the arm (230) is brought into contact with the upper plate of the case (210) to restrict the rotation of the arm (230), and in a case the disk (50) further descends in this state, the arm (230) linearly moves to the inner side of the lateral plate of the case (210).

Then, in a case the disk (50) further descends, an upper corner of the inner surface of the disk (50) is hitched by the lower surface at the distal end of the body at the arm (230) to inhibit the disk (50) from being disengaged.

The disk (50) has a deviation in its inner diameter within an error range. Therefore, in a case a disk with a small inner diameter is inserted into the case, there is needed a large insertion force, while in a case a disk with a large inner diameter is inserted into the case, there is needed a smaller insertion force. In a case the insertion force for inserting the disk (50) into the case (210) is great, there is a difficulty of the disk (50) being inserted into the case (210).

The clamping device (200) according to the exemplary embodiment of the present invention is so provided as to allow the disk (50) to be easily inserted into the case (210) regardless of size of the inner diameter of the disk (50).

To be more specific, due to depression of the disk (50) on a distal end of the body (231) at the arm (230), an upper plate portion of the case (210) contacted by the upper surface of the other distal end of the disengagement prevention rail (237) of the arm (230) is formed with an inclination surface (217) whose thickness tapers off toward the inner side of the case (210). At this time, although the entire portion of the upper plate of the case (210) may be the inclination surface (217), the inclination surface preferably starts from a predetermined radius of an inner side of the case (210).

Then, in a case the disk with a smaller inner diameter is inserted into the case (210), the arm (230) linearly moves toward the inner side of the lateral plate of the case (210) to allow the other distal end to further rotate upwards, whereby the disk (50) can be easily inserted into the case (210) with a little force, in a case an upper surface at the other distal end of the disengagement prevention rail (237) is brought into contact with the inclination surface (217) of the case (210).

The inclination surface (217) is provided in a straight manner. However, as the inclination surface (217) moves toward the inner side of the case (210), the thickness of the inclination surface (217) tapers off, such that the inclination surface (217) may take the form of a concave shape or a convex shape. At this time, in order to allow the arm (230) to have a smooth movement, a starting portion of the inclination surface (217) is preferably rounded.

The elastic member (240) is installed inside of the lateral plate at the case, where a distal end of the elastic member (240) is supported by a support protruder (231*a*) of the arm (230), while the other end is supported by a support protruder (210) to elastically support the arm (230) towards the periphery at the lateral surface of the case (210), whereby the disk (50) is securely supported by the arm (230).

Figure 6:
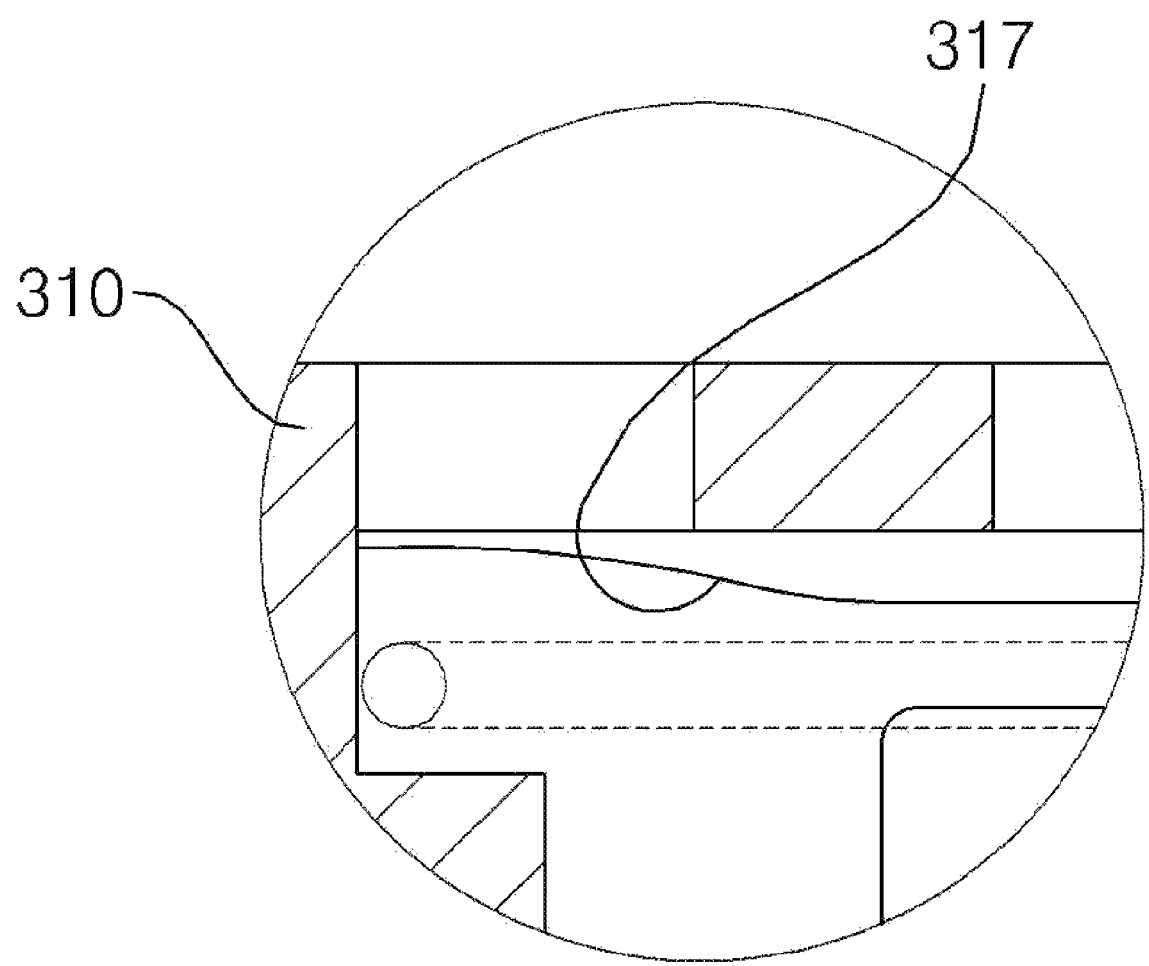
FIG. 6 is an enlarged view of essential parts according to another exemplary embodiment of the present invention.

FIG. 6 is an enlarged view of essential parts according to another exemplary embodiment of the present invention, where only difference from FIG. 5 will be described.

As depicted, an inclination surface (317) of a case (310) is formed with an upwardly curved shape.

While the present disclosure has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

What is claimed is:

1. A clamping device of a spindle motor, the device comprising:
   a case rotating with a rotation shaft and configured to be positioned in a central hole of a disk;
   a plurality of arms; and
   a plurality of elastic members elastically supporting the plurality of arms, respectively, wherein each elastic member is supported by a support protruder at a lateral inner surface of the case;
   wherein the case comprises a plurality of inclination surfaces, each at an inner surface of an upper portion of the case and corresponding to each arm, respectively,
   wherein each inclination surface has a thickness which tapers off in a direction approaching the rotation shaft, and
   wherein a thickness of each inclination surface, measured at a position farthest away from the rotation shaft, is less than a distance between the inner surface of the upper portion of the case and the support protruder.

2. The clamping device of claim 1, wherein each arm includes a body, a guide rail formed on the body, and a disengagement prevention rail formed at a side of the body, wherein a distal end of the body is positioned at a lateral outer side of the case to contact the central hole of the disk, and wherein another distal end of the body is positioned at a lateral inner side of the case for rotative and linear movement whereby the disk is inhibited from being disengaged from the case.

3. The clamping device of claim 1, wherein the inclination surface is formed as a flat surface.

4. The clamping device of claim 1, wherein the inclination surface is curved as concave or convex.

* * * * *